US010809841B2

United States Patent
Blondin et al.

(10) Patent No.: US 10,809,841 B2
(45) Date of Patent: Oct. 20, 2020

(54) METHOD OF HUMAN-MACHINE INTERACTION BY COMBINING TOUCH AND CONTACTLESS CONTROLS

(71) Applicant: QuickStep Technologies LLC, Wilmington, DE (US)

(72) Inventors: Christophe Blondin, Valleiry (FR); Didier Roziere, Nimes (FR)

(73) Assignee: QuickStep Technologies LLC, Wilmington, DE (US)

( * ) Notice: Subject to any disclaimer, the term of this patent is extended or adjusted under 35 U.S.C. 154(b) by 0 days.

(21) Appl. No.: 15/120,076

(22) PCT Filed: Feb. 17, 2015

(86) PCT No.: PCT/EP2015/053310
§ 371 (c)(1),
(2) Date: Aug. 18, 2016

(87) PCT Pub. No.: WO2015/124564
PCT Pub. Date: Aug. 27, 2015

(65) Prior Publication Data
US 2017/0108978 A1    Apr. 20, 2017

(30) Foreign Application Priority Data

Feb. 19, 2014 (FR) ...................................... 14 00445

(51) Int. Cl.
*G06F 3/041* (2006.01)
*G06F 3/044* (2006.01)
(Continued)

(52) U.S. Cl.
CPC ............ *G06F 3/0416* (2013.01); *G06F 3/044* (2013.01); *G06F 3/0488* (2013.01);
(Continued)

(58) Field of Classification Search
CPC .... G06F 3/0416; G06F 3/044; G06F 3/04845; G06F 3/04842; G06F 3/0485;
(Continued)

(56) References Cited

U.S. PATENT DOCUMENTS 5,483,261 A    1/1996 Yasutake
5,488,204 A    1/1996 Mead et al.
(Continued)

FOREIGN PATENT DOCUMENTS

EP    2 267 791 A2    10/2010
EP    2 687 954 A2    1/2014
(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
(Continued)

*Primary Examiner* — Richard J Hong
(74) *Attorney, Agent, or Firm* — Kubota & Basol LLP (57) ABSTRACT

The present invention relates to a process for interacting with an electronic and/or computer device comprising a command interface provided with capacitive sensors disposed in order to detect command objects, where said process comprises steps of: (i) searching (40) for objects described as contact in contact with the command interface surface; (ii) searching (41) for objects described as hovering at a distance from said command interface; and (iii) executing a command described as combined (43) when at least one contact object is present in at least one predefined contact area and at least one hovering object is present in at least one predefined hovering area, where said combined command (43) takes into consideration at least some information concerning said at least one hovering object.

The invention also relates to a command interface and a device implementing the process.

20 Claims, 2 Drawing Sheets

(51) Int. Cl.
*G06F 3/0488* (2013.01)
*G06F 3/0484* (2013.01)
*G06F 3/0485* (2013.01)

(52) U.S. Cl.
CPC ........ *G06F 3/04845* (2013.01); *G06F 3/0485* (2013.01); *G06F 3/04842* (2013.01); *G06F 2203/04104* (2013.01); *G06F 2203/04107* (2013.01); *G06F 2203/04108* (2013.01); *G06F 2203/04808* (2013.01)

(58) Field of Classification Search
CPC . G06F 2203/04104; G06F 2203/04107; G06F 2203/04108; G06F 3/0412; G06F 3/0488; G06F 1/1626; G06F 3/042; G06F 3/04883; G06F 3/04812
See application file for complete search history.

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,844,506 A | 12/1998 | Binstead | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 6,847,354 B2 | 1/2005 | Vranish | |
| 7,015,894 B2 | 3/2006 | Morohoshi | |
| 7,184,064 B2 | 2/2007 | Zimmerman et al. | |
| 7,570,064 B2 | 8/2009 | Roziere | |
| 7,663,607 B2 | 2/2010 | Hotelling et al. | |
| 8,149,002 B2 | 4/2012 | Ossart et al. | |
| 8,159,213 B2 | 4/2012 | Roziere | |
| 8,255,836 B1* | 8/2012 | Gildfind | G06F 3/04812 345/173 |
| 8,479,122 B2 | 7/2013 | Hotelling et al. | |
| 8,770,033 B2 | 7/2014 | Roziere | |
| 8,917,256 B2 | 12/2014 | Roziere | |
| 9,035,903 B2 | 5/2015 | Binstead | |
| 2006/0097733 A1 | 5/2006 | Roziere | |
| 2006/0197750 A1* | 9/2006 | Kerr | G06F 1/1626 345/173 |
| 2006/0197753 A1 | 9/2006 | Hotelling | |
| 2008/0122798 A1* | 5/2008 | Koshiyama | G06F 3/0412 345/173 |
| 2008/0284261 A1 | 11/2008 | Andrieux et al. | |
| 2009/0219255 A1* | 9/2009 | Woolley | G06F 3/0416 345/173 |
| 2009/0315834 A1 | 12/2009 | Nurmi et al. | |
| 2010/0052700 A1 | 3/2010 | Yano et al. | |
| 2010/0085317 A1* | 4/2010 | Park | G06F 1/1626 345/173 |
| 2011/0007021 A1* | 1/2011 | Bernstein | G06F 3/0416 345/174 |
| 2011/0109577 A1* | 5/2011 | Lee | G06F 3/044 345/173 |
| 2011/0169783 A1 | 7/2011 | Wang et al. | |
| 2012/0044662 A1 | 2/2012 | Kim et al. | |
| 2012/0187965 A1 | 7/2012 | Roziere | |
| 2012/0188200 A1 | 7/2012 | Roziere | |
| 2012/0254808 A1* | 10/2012 | Gildfind | G06F 3/04883 715/863 |
| 2012/0268410 A1* | 10/2012 | King | G06F 3/04883 345/173 |
| 2012/0326961 A1 | 12/2012 | Bromer | |
| 2013/0113762 A1 | 5/2013 | Geaghan | |
| 2013/0135247 A1 | 5/2013 | Na et al. | |
| 2013/0307776 A1 | 11/2013 | Roziere | |
| 2014/0132335 A1 | 5/2014 | Rauhala et al. | |
| 2014/0267130 A1* | 9/2014 | Hwang | G06F 3/0488 345/174 |
| 2015/0035792 A1 | 2/2015 | Roziere et al. | |
| 2015/0052481 A1* | 2/2015 | Ronkainen | G06F 3/04845 715/815 |
| 2015/0077345 A1* | 3/2015 | Hwang | G06F 3/0412 345/173 |
| 2015/0177866 A1* | 6/2015 | Hwang | G06F 3/042 345/175 |

FOREIGN PATENT DOCUMENTS

| | | |
|---|---|---|
| FR | 2756048 A1 | 5/1998 |
| JP | 2000-163031 A | 6/2000 |
| JP | 2002-342033 A | 11/2002 |
| WO | WO-2010/084498 A1 | 7/2010 |
| WO | WO-2011/136783 A1 | 11/2011 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI ' 92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Search Report received for French Patent Application No. FR1754917, dated Sep. 18, 2019, 16 pages (8 pages of English Translation and 8 pages of Official Copy).

\* cited by examiner

METHOD OF HUMAN-MACHINE INTERACTION BY COMBINING TOUCH AND CONTACTLESS CONTROLS

CROSS-REFERENCE TO RELATED APPLICATIONS

This application is a National Phase application under 35 U.S.C. § 371 of International Application No. PCT/EP2015/053310, filed Feb. 17, 2015, which claims the priority benefit of French Application No. 1400445, filed Feb. 19, 2014, the contents of which are hereby incorporated by reference in their entireties for all intended purposes.

TECHNICAL DOMAIN

The present invention relates to a process for human-machine interaction which implements combinations of tactile and contactless commands. It also relates to a human-machine interface implementing the process, and the device incorporating the interface.

The domain of the invention is more specifically, but without limitation, that of human-machine interfaces based on tactile and contactless command interfaces.

STATE OF THE PRIOR ART

Portable devices provided with tactile interfaces are well known. Computers provided with a touchscreen, smart phones and tablets can in particular be listed.

In general, they comprise a command interface superposed on the display screen allowing for direct interaction with information or display elements (via a command object such as a finger or a stylus).

Most of the time, the command interfaces implement capacitive technologies.

The most widespread techniques comprise electrodes arranged in the form of lines and columns. Essentially two measurement methods are used for the detection of command objects.

In a mutual capacitance measurement mode (generally called "mutual" mode), the coupling capacitances between line electrodes and row electrodes are measured. When a command object is brought near a recovery area, it disrupts the field lines and modifies the measured mutual capacitance. This method is limited to measurements by contact because of the low sensitivity thereof. In contrast, it is able to unambiguously detect several command objects simultaneously.

In an individual capacitance measurement mode (in general called "self"), the capacitance between each electrode and one or more command objects located nearby is measured. With this method, it is possible to detect objects at a distance from the electrodes, and therefore without contact. Just the same, because of the structure of the electrodes in lines and columns, the simultaneous presence of several objects generates phantoms which lead to false detections. The method is therefore essentially limited to the detection of one object at a time.

Command interfaces are known which make use of both techniques and which therefore provide:
the detection of a single, distant command object in "self" mode;
the detection of several objects in contact with the interface simultaneously by switching to "mutual" mode.

In that way, the human-machine interaction processes which are currently known and which are based on this type of technique only offer possibilities of interaction at very limited distances.

Furthermore, the interaction modes without contact and by contact ("touchless" and "touch") are managed separately and sequentially, which limits the command possibilities.

In the case of small "smart phone" type terminals, the possibilities for human-machine interactions are highly constrained by ergonomic aspects. In fact, if the terminal is handheld, with known human-machine interfaces, two problems arise:
The fingers of the hand which holds the device are not usable for commands and even bend over onto the touchpad and trigger unintended commands;
Therefore, only one hand is left for performing commands with the limitations brought up previously.

Additionally, capacitive measurement techniques are known which make it possible to obtain sufficiently high sensitivity in order to detect command objects in the neighborhood of individual, small size electrodes at a distance and without contact with the surface of the command interface.

The patent FR 2 756 048, for example, is known that describes a capacitive measurement solution with which to detect the position of a finger in contact and in space up to several centimeters distant from measurement electrodes.

The object of the present invention is to propose a method for human-machine interaction which allows the performance of commands implementing the combination of tactile and contactless commands.

The object of the present invention is also to propose a human-machine interaction process well-suited to the ergonomic constraints of using smart phone type devices.

The purpose of the present invention is also to propose a human-machine interaction process which allows using both hands for controlling smart phone type portable devices.

BRIEF DESCRIPTION OF THE INVENTION

This objective is achieved with a process for interacting with an electronic and/or computer device comprising a command interface provided with capacitive sensors disposed in order to detect command objects,
characterized in that it comprises steps of:
Searching for objects described as contact, corresponding to command objects in contact with a command interface surface;
Searching for objects described as hovering, corresponding to command objects at a distance from said command interface;
Executing a command described as combined when at least one contact object is present in at least one predefined contact area and at least one hovering object is present in at least one predefined hovering area, where said combined command takes into consideration at least some information concerning said at least one hovering object.

The process according to the invention can furthermore comprise a step of execution of a command described as hovering when at least one hovering object is present in at least one predefined hovering area and no contact object is present in at least one predefined contact area.

Depending on the embodiments, the process according to the invention can include:
A step of execution of a combined command derived from a hovering command (for example with modified execution parameters);

A step of execution of a combined command additionally considering information about at least one contact object.

Depending on the embodiments, the process according to the invention can additionally comprise a step of definition of at least one hovering area corresponding to at least one part of a display screen of the device.

Depending on the embodiments, the process according to the invention can additionally comprise a step of definition of at least one contact area corresponding to at least one part of the display screen of the device.

Depending on the embodiments, the process according to the invention can additionally comprise a step of definition of at least one external contact area among:

At least one peripheral contact area corresponding to a peripheral area of the display screen of the device;

At least one lateral contact area corresponding to an area on one side of the device substantially perpendicular to the surface supporting the display screen;

At least one rear contact area corresponding to an area on a surface of the device opposite the surface supporting the display screen.

The at least one external contact area (e.g. peripheral, lateral or rear) may comprise at least one area accessible with a finger of a hand which holds the device.

Depending on the embodiments, the method according to the invention can comprise a step of execution of a combined command implementing a spatial transformation around a reference point on an element shown on the display screen, Where said reference point is defined by the position of a contact object in a display contact area;

Where said spatial transformation depends on a trajectory of at least one hovering object;

Where said spatial transformation comprises at least one transformation among scaling, rotation and deformation.

Depending on the embodiments, the process according to the invention can comprise a step of execution of a combined command in response to the detection of a contact object in an external contact area (e.g. peripheral, lateral or rear), where said combined command comprises:

A confirmation or selection action in the context of the execution of a hovering command;

A blocking of a hovering command so as to make it insensitive to the movements or presence of a hovering object;

A change in the use of the trajectory or position information of a hovering object by a hovering command, so as to modify at least one of the following parameters: sensitivity, movement direction, switching from a zoom mode to a movement mode.

A switching from a hovering command corresponding to a scrolling of elements on the display screen as a function of the trajectory or the position of a hovering object to a command for scrolling sub elements contained in one of said elements as a function of the trajectory or the position of said hovering object.

According to another aspect, a command interface for interacting with an electronic and/or computer device, which includes capacitive sensors and electronic and calculation means disposed for:

Detecting command objects;

Searching for objects described as contact, corresponding to command objects in contact with a command interface surface;

Searching for objects described as hovering, corresponding to command objects at a distance from said command interface;

Triggering execution of a command described as combined when at least one contact object is present in at least one predefined contact area and at least one hovering object is present in at least one predefined hovering area, where said combined command takes into consideration at least some information concerning said at least one hovering object.

According to embodiments, the command interface from the invention can include:

Capacitive electrodes and guard elements excited to a guard electric potential substantially equal or exactly equal to the electric potential of said capacitive electrodes;

Capacitive electrodes arranged according to a matrix structure, where each capacitive electrode measures capacitance between said capacitive electrode and one or more command object(s).

According to another aspect, an electronic or computer device is proposed comprising a command interface according to the invention.

According to some embodiments, the device according to the invention can comprise:

A display screen, and a command interface with transparent capacitive electrodes arranged on said display screen;

A command interface disposed so as to allow the detection of contact objects in at least one predefined contact area external to the display screen, based on measurements coming from capacitive electrodes arranged on the display screen;

A command interface with capacitive electrodes arranged on at least one side of the device substantially perpendicular to the surface supporting the display screen, and/or on one face of the device opposite the face supporting the display screen and which are arranged so as to be able to be located within reach of the fingers of a hand holding the device.

The device according to the invention can in particular be smart phone or tablet type.

DESCRIPTION OF FIGURES AND EMBODIMENTS

Other advantages and specifics of the invention will appear upon reading the detailed description of implementations and embodiments which are in no way limiting.

It is well understood that the embodiments or implementations which will be described subsequently are in no way limiting. In particular one can imagine variants of the invention only comprising a selection of features described subsequently isolated from other features described, if this selection of features is sufficient to confer a technical advantage or distinguish the invention compared to the state of the prior art. This selection comprises at least one feature preferably functional without structural details or with only a portion of the structural details, if this part alone is sufficient to confer a technical advantage or for distinguishing the invention compared to the state of the technical art.

In particular all the variants and all the embodiments described can be combined with each other if at the technical level nothing prevents this combination.

In the figures, the elements appearing in several figures retain the same reference.

Figure 1:
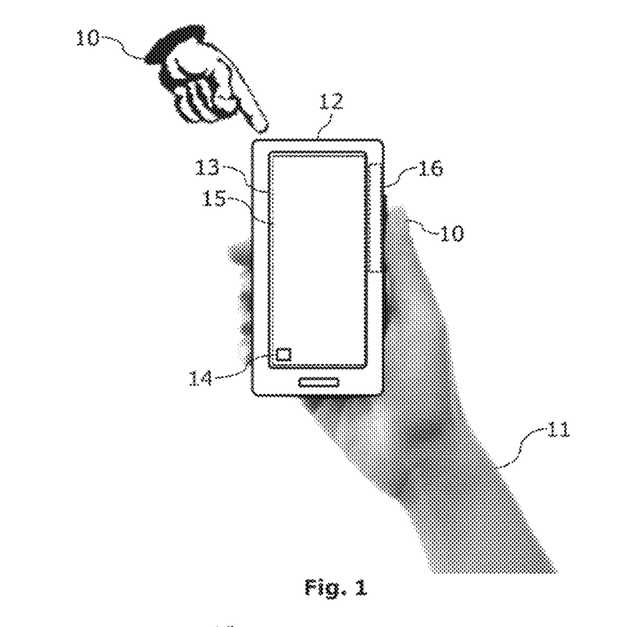
FIG. 1 shows a smart phone type electronic device according to the invention with the display screen provided with a touch interface, such as held in hand.
Figure 2:
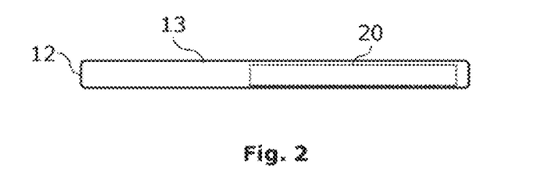
FIG. 2 shows a side view of a smart phone type electronic device according to the invention.

With reference to FIG. 1 and FIG. 2, an electronic device 12 according to the invention, designed for being handheld, is going to be described.

In the embodiment shown, this device is of portable phone or smart phone type. It is however well understood that these functions are in no way limiting. The embodiments described could just as well be implemented on a tablet type computer or on any electronic device of similar shape.

The device 12 comprises a display screen 13.

It also includes a command interface with, in particular, transparent capacitive measurement electrodes 14 arranged on the display screen 13.

These capacitive measurement electrodes 14 are disposed so as to be able to detect command objects 10, such as for example fingers 10, near or in contact with the surface.

They are implemented in a substantially transparent conducting material, such as for example ITO (indium tin oxide) deposited on a dielectric material (e.g. glass or polymer). They are superposed on a display screen 13, for example of TFT (thin-film transistor) or OLED (organic light-emitting diode) type.

The display screen 13 and the command interface with measurement electrodes 14 constitute a human-machine interface which allows interaction with the device 12.

The surface covered by the measurement electrodes 14 defines a detection area for command objects 10 called screen detection area 15.

According to an advantageous aspect of the invention, the command interface of the device 12 also includes detection areas which are external or on the edge of the display screen 13 which are arranged so as to allow more varied interactions with the user.

These external detection areas are positioned so as to be accessible to the command objects 10 corresponding to fingers of the hand or hands which hold the device 12

In the embodiment shown in FIG. 1 and FIG. 2, the device includes at least one peripheral detection area 16 located on the edge of the screen 13 on the same surface therewith. This peripheral detection area 16 is placed so as to be accessible in particular to the thumb of the hand 11 which holds the device.

In the embodiment shown in FIG. 1 and FIG. 2, the device also includes at least a lateral detection area 20 located on the edge or the side of the device 12. This lateral detection area 20 is placed so as to be accessible in particular to the thumb of the hand 11 which holds the device.

Depending on the embodiments, the peripheral detection area 16 and/or the lateral detection area 20 can comprise capacitive measurement electrodes which are distinct from those for the display screen 13.

According to other preferred embodiments, capacitive measurement electrodes for the periphery of the screen 13 are used in order to detect command objects 10 in the peripheral detection areas 16 and/or in the lateral detection areas 20 (or in a detection area encompassing peripheral detection areas 16 and lateral detection areas 20 such as shown in FIG. 1 and FIG. 2).

In fact, these capacitive electrodes from the edge are sensitive to the presence of command objects 10 beyond the limits of the screen 13. By comparing their measurements with those obtained by electrodes located closer to the interior of the screen 13, it is possible to determine that a detected command object 10 is located in a peripheral 16 or lateral 20 detection area, and not above the screen 13. This detection mode can be called a detection by edge effect.

In this case, the device according to the invention might not comprise capacitive measurement electrodes in the peripheral 16 and/or lateral 20 detection areas.

It should be noted that the peripheral detection area 16 and the lateral detection area 20 as shown in the figures are also accessible to other fingers besides the index finger when the device is held in the left hand.

Other configurations, not shown, are of course possible in the context of the invention. Thus, depending on embodiment variants, the device according to the invention can comprise:

At least one lateral detection area 20 and/or at least one peripheral detection area 16;

At least two lateral detection areas 20 and/or at least two peripheral detection areas 16 arranged symmetrically around the display screen 13;

At least one lateral detection area 20 and/or at least one peripheral detection area 16 located on or facing the sides of the device in contact with the index fingers when the device is held by two hands, for example with the display screen oriented in "landscape" mode.

Figure 3:
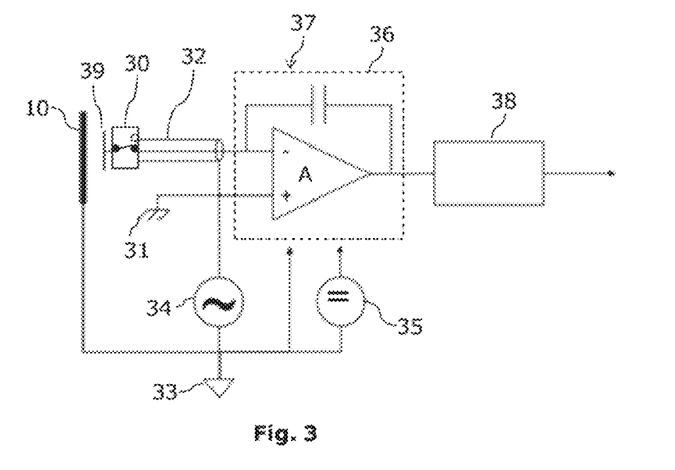
FIG. 3 shows an embodiment of electronics for detection for a command interface according to the invention.

With reference to FIG. 3, an embodiment of detection electronics is now going to be described which serves to implement a command interface.

In this embodiment, the capacitive electrodes 39 (which correspond to the measurement electrodes 14 of the screen 13 and/or to the measurement electrodes of the external detection areas) serve to detect the presence and/or to measure the distance of at least one command object 10 in their vicinity.

In particular, the capacitive electrodes 39 corresponding to the measurement electrodes 14 of the screen 13 and their associated electronics are disposed so as to allow the simultaneous detection of several command objects 10 in different configurations, including in particular:

Command objects 10 in contact with the surface of the screen 13;

Command objects 10 at a distance from the surface of the screen 13;

Some command objects 10 in contact with the surface of the screen 13 and others at a distance.

The position of the one or more command objects 10 relative to the device 12 (and/or their location in a detection area) is determined based on the position of the measurement electrodes 39 which detected these command objects 10.

The distance between the command objects 10 and the electrodes 39, or at least information representative of this distance, is determined based on capacitive coupling measurements between these electrodes 39 in the command objects 10.

With this embodiment, sufficient measurement sensitivity can be obtained in order to detect and locate command objects 10 which are in contact with the surface of the device 12 or with electrodes 14 in particular or which move near the device 12 at a nonzero distance from the surface thereof.

Guard elements, in the form of guard electrodes or guard planes (not shown), are positioned along the rear surface of measurement electrodes 39, relative to the detection areas for command objects 10. The function of these guard elements is to avoid parasitic electrical couplings between the measurement electrodes 39 and their environment, as will be explained later.

In the case of the display screen 13, the guard elements are also made of a substantially transparent conducting material, such as for example ITO (indium tin oxide). They are separated from the measurement electrodes 16 by a layer of dielectric material.

The measurement electrodes 39 are connected to electronic means of capacitive measurement 37.

These electronic means of capacitance measurement 37 are made in the form of a floating-point capacitive measurement system such as described for example in the Rozière patent FR 2 756 048.

The detection circuit includes a portion described as floating 36 for which the reference potential 31, called guard potential 31, oscillates relative to the overall system ground 33, or to earth ground. The alternating potential difference between the guard potential 31 and the ground 33 is generated by an excitation source, or an oscillator 34.

The guard elements are connected to the guard potential 31.

The floating part 36 includes the sensitive part for the capacitive detection, shown in FIG. 3 by a charge amplifier. It can of course include other means of signal processing and conditioning, including digital or microprocessor-based, also referenced to guard potential 31. With these means of processing and conditioning, distance and pressure information can be calculated, for example, from the capacitive measurement.

The electrical supply for the floating-point 36 is provided by floating means of supply transfer 35 comprising for example DC-DC converters.

With this capacitive measurement system, capacitance information between at least one measurement electrodes 39 and one command object 10 can be measured.

The command object 10 must be connected to a different potential than the guard potential 31, such as the ground potential 33 for example. We are well within this configuration when the command object 10 is a finger of a user, whose body defines a ground, or an object (such as a stylus) handled by this user.

Using a set of switches or analog switches 30, driven by electronic control means, a measurement electrode 39 can be selected and connected to the capacitive detection electronics 37 in order to measure the capacitive coupling with the control object 10. The switches 30 are configured such that the measurement electrode 39 is connected either to the capacitive detection electronics 37 or to the guard potential 31.

The sensitive part of the detection is protected by guard shielding 32 connected to guard potential 31.

In that way, a measurement electrode 39 connected by a switch 30 to the capacitive detection electronics 37 (or active measurement electrode 39) has guard planes near it made up at least in part by inactive measurement electrodes 39 and by guard elements connected to the guard potential 31.

Since the active measurement electrode 39 is also at guard potential 31 the appearance of parasitic capacitances between this electrode and its environment is thus avoided such that only the coupling with the object of interest is measured with a maximum sensitivity.

The outlet of the floating electronics 36 is connected to the device electronics 38 referenced to the ground by electrical connections compatible with the difference in reference potentials. These links can comprise, for example, differential amplifiers or optical couplers.

With the switches 30, the measurement electrodes 14 from the screen 13 and the measurement electrodes from the external detection areas can in that way be sequentially polled or queried.

Of course, several electronic pathways for capacitive detection 37 can be implemented in parallel each controlling a subset of electrodes 39. An electronic pathway for capacitive detection 37 can for example be implemented in order to control the electrodes 14 of the screen 13 and an electronic pathway for capacitive detection 37 in order to control the electrodes in the external detection areas.

We are now going to describe examples of implementation methods of the control process according to the invention in order to interact with a device such as the one described in connection with FIG. 1, FIG. 2 and FIG. 3.

Of course, these embodiments are nonlimiting examples. Additionally, the control process according to the invention can be implemented on a device in addition to or in parallel with other known control or command generation processes.

The device 12 such as described in relation to FIG. 1, FIG. 2 in FIG. 3 is an example of a device specifically suited to implement the control process according to the invention. However, the control process according to the invention can be understood to be implemented in any suitable device without going outside the scope of the invention.

In the control processes for tactile and contactless command interfaces from the prior art, two types of commands are typically found:

Commands described as contact which are executed when one command object touches the tactile command interface. It can, for example, involve commands for selection of an element displayed on the screen 13 (e.g. selection of a piece of music, selection of an email in order to display the content, etc.) or for approval.

Commands described as hovering, which are executed when a control object 10 is detected near the surface of the command interface. It can, for example, involve commands for moving displayed items or for opening a pop-up window making it possible to view the content.

For convenience, a command object 10 which touches the surface of the tactile command interface is named a contact object and a command object 10 which is detected near the surface of the command interface is named a hovering object.

Figure 4:
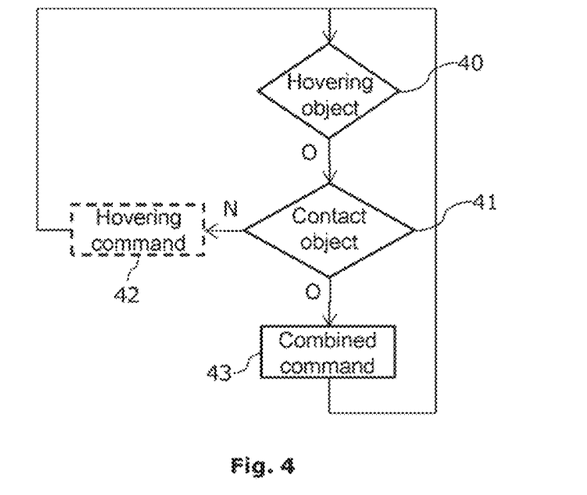
FIG. 4 shows a flowchart for the process according to the invention.

With reference to FIG. 4, according to the control process from the invention, another type of command is introduced, called combined command 43, which is triggered when at least one contact object is present in at least one predefined contact area and at least one hovering object is present in at least one predefined hovering area.

Therefore in general, the process according to the invention includes steps of:

Searching 40 for hovering objects;

Searching 41 for contact objects;

Execution of the combined command 43 if at least one contact object is present in at least one predefined contact area or potentially execution of a hovering command 42 in the other case.

The steps of searching 40 for hovering objects and searching 41 for contact objects can of course be done in any order.

The predefined contact areas and the predefined hovering areas are selected among the screen detection areas 15 and the external detection areas of the command interface such as defined in connection with FIG. 1 and FIG. 2.

Figure 5:
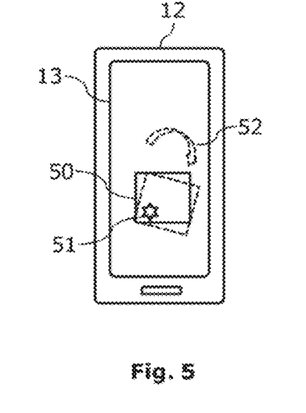
FIG. 5 shows modes of interaction with an electronic device according to the invention involving a detection area corresponding to the display screen.

With reference to FIG. 5, in certain embodiments of the control process according to the invention, the predefined contact and hovering areas are included in the screen detection area 15.

In this case, the process according to the invention can be implemented in a device 12 whose command interface is limited to a touchpad 13, in so far as the capacitive sensors used are capable of simultaneously detecting at least one contact object and at least one hovering object.

According to a sample embodiment, the process according to the invention comprises the execution of a combined command 43 implementing a spatial (or geometric) transformation around a reference point 51 on an element 50 (such as a preselected image) shown on the display screen 13:

A first command object 10 (a finger or a stylus), or contact object, is placed on the surface of the touchpad 13. The position thereof defines a reference point 51;

The second command object 10 (another finger), or hovering object, is moved above the surface of the touchpad 13 along a two- or three-dimensional trajectory 52;

The element 50 is then moved or deformed as a function of the selected spatial transformation, which can include for example scaling, rotation or deformation. The reference point 51 serves as the origin for the transformation. It therefore corresponds to a center of rotation such as shown in FIG. 4 for rotation, or a fixed area for scaling or deformation.

A movement of the contact object on the surface of the touchpad can additionally allow, as selected, movement of the element 50 on the display 13 or movement of the reference point 51 relative to the element 50.

With reference to FIG. 5, in some embodiments of the control process according to the invention, the predefined contact and hovering areas correspond to distinct detection areas of the command interface.

In particular, in some embodiments:

The predefined hovering area is included in the screen detection area 15;

The contact area corresponds to at least one external detection area such as a lateral detection area 20 and/or a peripheral detection area 16. It is then called respectively lateral contact area 20 or peripheral contact area 16.

A lateral detection area 20 arranged on the edge of the device 12 so as to be easily accessible with a finger (a command object 10) of a hand holding this device 12 can for example be used as a contact area.

Figure 6:
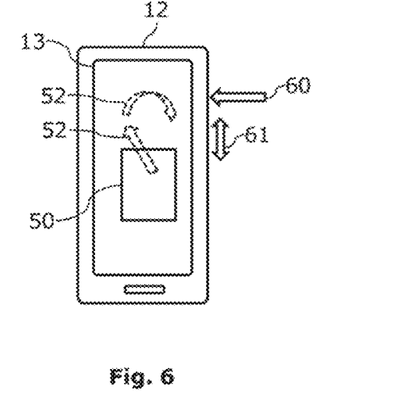
FIG. 6 shows modes of interaction with an electronic device according to the invention involving detection areas corresponding to the display screen.

According to embodiment examples, the process according to the invention can include execution of a combined command 43 in response to the detection of a contact object 10 in a peripheral 16 or lateral 20 contact area.

It is then possible with the fingers of the hand 11 holding the device 12 to perform actions which serve to modify the hovering commands 42 done by moving a hovering object above the screen 13 or to add additional controls thereto. The possibilities for interactions with the device are in that way considerably increased.

For example:

A "tap" or extended press 60 of the contact object 10 in a peripheral 16 or lateral 20 contact area can be used as confirmation or selection command in connection with the execution of a hovering command 42;

A "tap" or extended press 60 of a contact object 10 in a peripheral 16 or lateral contact area can be used for temporarily blocking a hovering command 42, so as to allow movement or withdrawal of the hovering object without introducing an additional hovering command 42. In particular, the display 13 can be made momentarily insensitive in this way to movements 52 or the presence of a hovering object;

A "tap", prolonged press 60 or movement 61 of the contact object 10 in a peripheral 16 or lateral 20 contact area can be used in order to modify the way in which a hovering command 42, which performs a movement or spatial transformation of an element 50 (such as a graphical image or object) on the display 13, interprets or considers trajectory or position information 52 of a hovering object. In particular, at least one of the following parameters can be modified: sensitivity, direction of movement, or switching from a zoom mode (modification of the size of the element 50) to a movement mode (of the element 50 on the screen 13);

A "tap" or prolonged press 60 of a contact object 10 in a peripheral 16 or lateral contact area can be used in order to transform a hovering command 42 corresponding to a scrolling of elements 40 on the display screen 13 as a function of the trajectory or position 52 of a hovering object into a command corresponding to a scrolling of sub elements contained in one of the elements 50 (still as a function of the trajectory or position 52 of the hovering object).

Of course, the invention is not limited to the examples which were just described and many improvements can be made to these examples without going outside the scope of the invention.

The invention claimed is:

1. A method comprising:
   at an electronic device with a touch-sensitive display and a predefined contact area that is separate from the touch-sensitive display and is located at or near an edge of the touch-sensitive display:
   displaying a user interface on the touch-sensitive display;
   while displaying the user interface on the touch-sensitive display, detecting a first hovering input over a first portion of the user interface, wherein the first hovering input includes:
     a first movement portion comprising movement of a hovering object to a hovering position over the first portion of the user interface, and
     a second movement portion, after the first movement portion, comprising a lateral movement of the hovering object while the hovering object remains hovering over the first portion of the user interface; and
   in response to detecting the first hovering input:
     in accordance with a determination that the hovering object is detected over the first portion of the user interface without detecting a contact object in the predefined contact area that is separate from the touch-sensitive display and is located at or near the edge of the touch-sensitive display, executing a first command that includes performing a first operation in the user interface based on the second movement portion of the first hovering input; and
     in accordance with a determination that the hovering object is detected over the first portion of the user interface while the contact object is detected in the predefined contact area that is separate from the touch-sensitive display and is located at or near the edge of the touch-sensitive display, executing a second command, different than the first command, wherein the second command includes performing a second operation in the user interface based on the second movement portion of the first hovering input, and the second operation is different from the first operation.

2. The method of claim 1, wherein the electronic device includes another predefined contact area separate from the touch-sensitive display and located on a surface of the electronic device opposite the touch-sensitive display.

3. The method of claim 2, wherein the another predefined contact area comprises at least one area accessible with a finger of a hand which holds the electronic device.

4. The method of claim 1, further comprising:

detecting a contact object on the touch-sensitive display;

wherein the first operation comprises a spatial transformation around a location of the contact object detected on the touch-sensitive display, wherein the spatial transformation depends on the lateral movement of the hovering object; and wherein the spatial transformation comprises at least one transformation among scaling, rotation and deformation.

5. The method of claim 1, wherein the contact object detected in the predefined contact area corresponds to a tap, a prolonged press, or movement in the predefined contact area.

6. The method of claim 1, wherein the first operation comprises a first scrolling operation to scroll through a plurality of elements displayed on the touch-sensitive display based on a trajectory of the hovering object over the touch-sensitive display, and the second operation comprises a second scrolling operation to scroll through a plurality of sub-elements corresponding to one of the plurality of elements displayed on the touch-sensitive display based on the trajectory of the hovering object over the touch-sensitive display.

7. The method of claim 1, wherein second operation comprises a blocking operation to ignore the movement of the hovering object while the contact object is detected.

8. The method of claim 1, wherein the first operation comprises a movement operation or a spatial transformation operation with a first sensitivity parameter or a first direction parameter and the second operation comprises the movement operation or the spatial transformation operation with a second sensitivity parameter different from the first sensitivity parameter or with a second direction parameter different from the first direction parameter.

9. The method of claim 1, wherein the first operation comprises a zoom operation of an element of the user interface displayed on the touch-sensitive display of the electronic device, and the second operation comprises a movement operation of the element of the user interface displayed on the touch-sensitive display of the electronic device.

10. An electronic device comprising a touch-sensitive display, a predefined contact area that is separate from the touch-sensitive display and is located at or near an edge of the touch-sensitive display, and device electronics configured for:

displaying a user interface on the touch-sensitive display;

while displaying the user interface on the touch-sensitive display, detecting a first hovering input over a first portion of the user interface, wherein the first hovering input includes:

a first movement portion comprising movement of a hovering object to a hovering position over the first portion of the user interface, and a second movement portion, after the first movement portion, comprising a lateral movement of the hovering object while the hovering object remains hovering over the first portion of the user interface; and in response to detecting the first hovering input:

in accordance with a determination that the hovering object is detected over the first portion of the user interface without detecting a contact object in the predefined contact area that is separate from the touch-sensitive display and is located at or near the edge of the touch-sensitive display, executing a first command that includes performing a first operation in the user interface based on the second movement portion of the first hovering input; and in accordance with a determination that the hovering object is detected over the first portion of the user interface while the contact object is detected in the predefined contact area that is separate from the touch-sensitive display and is located at or near the edge of the touch-sensitive display, executing a second command, different than the first command, wherein the second command includes performing a second operation in the user interface based on the second movement portion of the first hovering input, and the second operation is different from the first operation.

11. The electronic device of claim 10, wherein the touch-sensitive display comprises capacitive electrodes and one or more guard electrodes excited to a guard electric potential substantially equal or exactly equal to the electric potential of the capacitive electrodes.

12. The electronic device of claim 10, wherein the touch-sensitive display comprises a matrix of capacitive electrodes, and wherein each of the capacitive electrodes measures a capacitance between the capacitive electrode and one or more objects.

13. The electronic device of claim 10, wherein the contact object is detected in the predefined contact area based on measurements of capacitive electrodes of the touch-sensitive display.

14. The electronic device of claim 10, wherein the predefined contact area further includes at least one side of the electronic device substantially perpendicular to the touch-sensitive display.

15. The electronic device of claim 10, which is smart phone or tablet.

16. The electronic device of claim 10, wherein the first operation comprises a first scrolling operation to scroll through a plurality of elements displayed on the touch-sensitive display based on a trajectory of the hovering object over the touch-sensitive display, and the second operation comprises a second scrolling operation to scroll through a plurality of sub-elements corresponding to one of the plurality of elements displayed on the touch-sensitive display based on the trajectory of the hovering object over the touch-sensitive display.

17. The electronic device of claim 10, wherein second operation comprises a blocking operation to ignore the movement of the hovering object while the contact object is detected.

18. The electronic device of claim 10, wherein the first operation comprises a movement operation or a spatial transformation operation with a first sensitivity parameter or a first direction parameter and the second operation comprises the movement operation or the spatial transformation operation with a second sensitivity parameter different from the first sensitivity parameter or with a second direction parameter different from the first direction parameter.

19. The electronic device of claim 10, wherein the first operation comprises a zoom operation of an element of the user interface displayed on the touch-sensitive display of the electronic device, and the second operation comprises a movement operation of the element of the user interface displayed on the touch-sensitive display of the electronic device.

20. The electronic device of claim 10, wherein the device electronics are further configured for:
 detecting a contact object on the touch-sensitive display;
 wherein the first operation comprises
 a spatial transformation around a location of the contact object detected on the touch-sensitive display, wherein the spatial transformation depends on the lateral movement of the hovering object; and
 wherein the spatial transformation comprises at least one transformation among scaling, rotation and deformation.

* * * * *